(12) United States Patent
Shaffer et al.

(10) Patent No.: US 7,893,176 B2
(45) Date of Patent: Feb. 22, 2011

(54) POLYDISPERSITY-CONTROLLED ISOOLEFIN POLYMERIZATION WITH POLYMORPHOGENATES

(75) Inventors: Timothy D. Shaffer, Hackettstown, NJ (US); Michael F. McDonald, Kingwood, TX (US); David Y. Chung, Bellaire, TX (US); Robert N. Webb, Kingwood, TX (US); Deborah J. Davis, Pasadena, TX (US); Pamela J. Wright, Easton, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1001 days.

(21) Appl. No.: 11/728,306

(22) Filed: Mar. 23, 2007

(65) Prior Publication Data

US 2008/0234447 A1 Sep. 25, 2008

(51) Int. Cl.
*C08F 4/28* (2006.01)
*C08F 2/14* (2006.01)
*C08F 10/10* (2006.01)

(52) U.S. Cl. .................... 526/235; 526/60; 526/135; 526/189; 526/206; 526/208; 526/209; 526/210; 526/212; 526/216; 526/224; 526/348.7

(58) Field of Classification Search .................. 526/60, 526/135, 186, 206, 208, 209, 212, 216, 224, 526/189, 235, 348.7
See application file for complete search history.

(56) References Cited

U.S. PATENT DOCUMENTS

| | | | | |
|---|---|---|---|---|
| 3,433,775 | A * | 3/1969 | Ray et al. | .............. 526/59 |
| 4,605,808 | A * | 8/1986 | Samson | ................ 585/525 |
| 4,943,616 | A * | 7/1990 | Mishra et al. | .............. 525/264 |
| 5,087,329 | A | 2/1992 | Felix | |
| 5,200,431 | A | 4/1993 | Dattani et al. | |
| 5,417,930 | A | 5/1995 | McDonald, Jr. et al. | |
| 5,470,442 | A | 11/1995 | Mahler et al. | |
| 5,506,316 | A * | 4/1996 | Shaffer | ................ 526/185 |
| 5,723,429 | A | 3/1998 | Mahler et al. | |
| 5,744,662 | A | 4/1998 | Moallemi | |
| 5,830,325 | A | 11/1998 | Mahler et al. | |
| 6,156,161 | A | 12/2000 | Miller | |
| 6,307,115 | B1 | 10/2001 | Guiraud et al. | |
| 6,527,917 | B1 | 3/2003 | Kohno et al. | |
| 6,579,959 | B2 * | 6/2003 | Yoshimi et al. | ............. 526/209 |
| 2005/0101751 | A1 | 5/2005 | Shaffer et al. | |
| 2005/0107536 | A1 | 5/2005 | Shaffer et al. | |
| 2006/0079655 | A1 | 4/2006 | Chung et al. | |
| 2006/0084770 | A1 | 4/2006 | Milner et al. | |
| 2006/0094847 | A1 | 5/2006 | Milner et al. | |
| 2006/0100398 | A1 | 5/2006 | Shaffer et al. | |
| 2006/0111522 | A1 | 5/2006 | McDonald et al. | |

FOREIGN PATENT DOCUMENTS

| | | |
|---|---|---|
| CN | 1134710 | 10/1996 |
| CN | 1417234 | 5/2003 |
| EP | 1 003 699 | 5/2000 |
| WO | WO 02/50141 | 6/2002 |
| WO | WO 03/037940 | 5/2003 |
| WO | WO 2004/058827 | 7/2004 |
| WO | WO 2004/058828 | 7/2004 |
| WO | WO 2004/058829 | 7/2004 |
| WO | WO 2004/067577 | 8/2004 |
| WO | WO 2006/009550 | 1/2006 |
| WO | WO 2006/009553 | 1/2006 |
| WO | WO 2006/011868 | 2/2006 |
| WO | WO 2007/042516 | 4/2007 |

OTHER PUBLICATIONS

Morrison, R.T. et al, "*Macromolecules, Polymers and Polymerization*", Chapter 31, Organic Chemistry, 6th Edition, Prentice Hall Inc., Engelwood Cliffs, NJ, pp. 1084-1085, (1992).
Qui, Ying-Xin et al, "*Cationic Polymerization of Isobutylene with H2O/TiCl4 Initiating System In The Presence of Electron Pair Donors*", vol. 41., No. 2, Feb. 2005, European Polymer Journal, Pergamon Press Ltd. Oxford, GB, pp. 349-358.

* cited by examiner

*Primary Examiner*—Fred M Teskin
(74) *Attorney, Agent, or Firm*—Nancy T. Krawczyk; Xiaobing Feng

(57) ABSTRACT

The disclosure provides for a process and polymerization system to produce isoolefin polymers (72) utilizing polymorphogenates (16, 26) in the catalyst system to control polydispersity (MWD). The disclosure also provides a catalyst system (20) comprising a plurality of active catalyst complex species (34) formed by combination of a Lewis acid (24), an initiator (22) and a polymorphogenate (26), as well as polymers made using the catalyst system or process. The polymorphogenate (16, 26) can promote or mimic the formation of different active catalyst complex species (34) having different polymerization rates, i.e. different rates of propagation, chain transfer, or termination, as observed by different polydispersities resulting from the presence of relatively different proportions of the polymorphogenate.

26 Claims, 2 Drawing Sheets

POLYDISPERSITY-CONTROLLED ISOOLEFIN POLYMERIZATION WITH POLYMORPHOGENATES

FIELD OF INVENTION

The disclosure relates to new polymerization methods and polymerization systems using polymorphogenates in a catalyst system to control polydispersity or molecular weight distribution (MWD).

BACKGROUND

Isoolefin polymers are prepared in carbocationic polymerization processes. Of special importance is butyl rubber which is a copolymer of isobutylene with a small amount of isoprene. Butyl rubber is made by low temperature cationic polymerization that generally requires that the isobutylene have a purity of >99.5 wt % and the isoprene have a purity of >98.0 wt % to prepare high molecular weight butyl rubber.

The carbocationic polymerization of isobutylene and its copolymerization with comonomers like isoprene is mechanistically complex. See, e.g., *Organic Chemistry*, SIXTH EDITION, Morrison and Boyd, Prentice-Hall, 1084-1085, Englewood Cliffs, N.J. 1992, and K. Matyjaszewski, ed, *Cationic Polymerizations*, Marcel Dekker, Inc., New York, 1996. The catalyst system is typically composed of two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation. Of these, the diluent is typically considered important.

Industry has generally accepted widespread use of a slurry polymerization process to produce butyl rubber, polyisobutylene, etc. Typically, the polymerization process extensively uses methyl chloride at low temperatures, generally lower than −90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange.

More recently, the polymerization of isobutylene and other monomers in hydrofluorocarbon (HFC) diluents has been disclosed. The utilization of HFC's in diluents or blends of diluents has created new polymerization systems that reduce particle agglomeration, and also can eliminate or reduce the amount of chlorinated hydrocarbons such as methyl chloride in polymerization systems. Such new polymerization systems reduce particle agglomeration and reactor fouling without having to compromise process parameters, conditions, or components and/or without sacrificing productivity/throughput and/or the ability to produce high molecular weight polymers. HFC's are chemicals that are currently used as environmentally friendly refrigerants because they have a very low (even zero) ozone depletion potential. Their low ozone depletion potential is thought to be related to the lack of chlorine. The HFC's also typically have low flammability particularly as compared to hydrocarbons and chlorinated hydrocarbons.

Some polymerization media, processes, reactors and systems that can employ HFC's are disclosed in the following commonly assigned patent references: WO2004058827; WO2004058828; WO2004058829; WO2004067577; WO2006011868; US2005101751; US2005107536; US2006079655; US2006084770; US2006094847; US2006100398; and US2006111522.

The use of HFC's in polymerization processes has also required finding new post-polymerization or "downstream" processes that can accommodate such new technology. For example, commonly assigned WO2006009550 discloses filtration to remove polymer from a slurry in an HFC-containing diluent. In addition, the diluent may contain components that need to be removed before the reactor effluent may be recycled to the polymerization process. Post polymerization reactor effluents containing isobutylene or other monomers are not usable as carriers for the catalyst system due to the polymerization of contained isobutylene before entry to the reactor and to the deleterious effects this has on catalyst system quality. Thus, it is essential to have a method for recovering a diluent such as HFC or at least a portion of the HFC from the post-polymerization reactor effluent before it may be recycled as a diluent into the polymerization process.

In conventional butyl rubber polymerization, isobutylene and methyl chloride can be easily separated by conventional distillation. However, azeotropic mixtures or azeotrope-like mixtures involving HFC's in other areas have been encountered in the past. See, e.g., U.S. Pat. Nos. 5,087,329, 5,200,431, 5,470,442, 5,723,429, 5,744,662, 5,830,325, 6,156,161, 6,307,115, 6,527,917, and EP 1 003 699 B. Some HFC's such as, for example, 1,1,1,2-tetrafluoroethane ("R134a") and 1,1-difluoroethane ("R152a") form maximum boiling azeotropes or azeotrope-like mixtures with isobutylene. Thus, the post-polymerization separation of certain HFC's from unreacted monomers such as isobutylene by simple distillation is not always possible. An extractive distillation method for separating slurry components from a polymerization reactor employing HFC diluent is disclosed in commonly assigned WO2006/009553.

The polydispersity, also called molecular weight distribution (MWD=Mw/Mn), of butyl rubber prepared commercially is typically broader than the expected most-probable distribution (2.0) and varies from plant to plant. For example, isobutylene polymerization in an HFC-containing diluent has been found to generally produce polymers with a narrower MWD than methyl chloride diluent.

It has now been discovered that the types and levels of trace impurities in the recycled diluents and unreacted monomers can be different for different production facilities, which may result from differences in the manner in which the various diluents and monomers are processed and recovered from the reactor effluents for recycle. For example, methyl chloride may hydrolyze when water is present, such as in water quenching of the reactor effluent in some production facilities, to form methanol and dimethyl ether, which can then contaminate recycled diluent and/or monomer if it is not removed in the recovery of the diluent and unreacted monomer. Moreover, fresh monomer and diluent makeup streams sometimes can contain relatively high contaminant levels that may go unnoticed. It is thus seen that the types and levels of impurities can fluctuate uncontrollably in a production facility. Steps are frequently undertaken to remove water and hydrolysis products from entering monomer and other feed streams to the reactor.

Heretofore, it has been common practice in the production of butyl rubber to adjust the rate of catalyst supply (Lewis acid and initiator) to the reactor to try to obtain the desired molecular weight of the polymer. In a typical production facility, the recovered polymer or polymer cement is sampled downstream from the reactor, and the molecular weight is gauged by Mooney viscometer readings or other rheological correlations, or by more rigorous testing such as gel permeation chromatography (GPC). If the molecular weight is off target, the catalyst feed has typically been adjusted, the process allowed to line out at steady state, and another reading taken to see if the molecular weight is closer to the target. The time between sampling and molecular weight determination is frequently as much as an hour or more, during which time off-spec product may be produced and other process conditions may have changed. Sometimes it can be difficult or seemingly impossible for one facility to produce a butyl rubber matching the specifications of another facility.

Chinese Patent Application No. 01134710.4, Public Disclosure No. CN 1417234A, discloses a method for the preparation of isoolefin polymers or copolymers by cationic polymerization in which a homopolymerization reaction of $C_4$-$C_7$ isoolefin monomers or a copolymerization reaction with other monomers is performed in a chlorohydrocarbon diluent using a Lewis acid as the primer, to which reaction system it is suggested to add such dispersing agents as carboxylic acid esters, ethers, ketones, amines, styrenes or alkyl substituted styrenes. The dispersing aids are said to lower the viscosity of the polymerization system and to make the dispersion of the insoluble polymer granules more uniform in the diluent. The reference claims that at a reaction temperature below −20° C., a stably dispersed polymer system can be obtained, the problem of heat transfer and mass transfer can be effectively improved, the dispersing agent that has been added can be easily obtained, and, at the same time, a narrower MWD of the polymer is obtained. However, there is no disclosure of any specific co-initiator for the Lewis acid, and some of the dispersing aids are known comonomers.

Applicant proposes herein that some types and levels of adventitious components in some polymerization reactor feeds may have a heretofore unrecognized and/or unpredictable effect on the molecular weight and/or MWD. Polymerization methods and systems to adjust the MWD in a controllable manner would be desirable for several reasons such as being able to more closely match the distribution of products prepared at different plants and/or with different diluents or catalyst systems, to tailor the distribution of products prepared in new processes, and potentially to prepare new product grades.

SUMMARY OF THE INVENTION

This disclosure provides new polymerization systems and processes using a new class of catalyst system modifiers, referred to herein as polymorphogenates. A polymorphogenate modifies the catalyst system to promote or mimic the formation of different active catalyst complex species having different polymerization rates, i.e. different propagation, chain transfer, or termination reactions, as observed by different polydispersities resulting from the presence of relatively different proportions of the polymorphogenate. The polymorphogenate is preferably selected from molecular oxygen and chalcogenates, for example, organic oxygenates and corresponding thio compounds. In the polymerization of isoolefin monomers with a Lewis acid and initiator in diluent, the polymorphogenate is used as a control mechanism to modulate the molecular weight characteristics of the polymers produced, including MWD.

In one aspect the disclosure provides a method to polymerize one or more monomer(s) to form isoolefin polymers and copolymers with a controlled MWD greater than 2.0. The method includes polymerizing the one or more monomer(s) in a polymerization medium comprising the one or more monomer(s), a diluent and a catalyst system. The diluent can be one or more halogenated hydrocarbon(s). The catalyst system can include one or more Lewis acid(s), and a plurality of modifiers comprising one or more polymorphogenate(s) (which may or may not be an initiator) and one or more initiator(s) (which may or may not be another polymorphogenate). In one embodiment, the amount of polymorphogenate(s) is adjusted so that the isoolefin polymers and copolymers having a controlled MWD greater than 2.0.

In an embodiment, the method can include supplying the polymerization medium in one or more feed stream(s) to a reactor for the polymerization, recovering a mixture of polymer and diluent from the reactor, separating diluent from the mixture to recover the polymer, and recycling the separated diluent to the one or more reactor feed stream(s). At least one of the one or more polymorphogenate(s) can be added to at least one of the one or more feed stream(s).

In an embodiment, the diluent separation can include removal of polymorphogenates. In another embodiment, the diluent separation can include distillation, e.g. simple distillation or extractive distillation. In other embodiments, the mixture recovered from the reactor can be in the form of a slurry of the polymer in the diluent.

In an embodiment, the polymorphogenate addition can include determining polymorphogenate level in at least one of the one or more feed stream(s) and controlling a rate of the polymorphogenate addition to obtain a polymorphogenate desired level. Alternatively or additionally, the polymorphogenate addition can include determining MWD of the recovered polymer and proportionally adjusting a rate of the polymorphogenate addition to control the MWD and/or proportionally adjusting the polymorphogenate desired level. In embodiments, the one or more polymorphogenate(s) can be added to a monomer feed stream comprising diluent, and/or to a catalyst feed stream comprising the one or more Lewis acid(s).

Another aspect of the disclosure provides a method to polymerize one or more monomer(s) to form isoolefin polymers and copolymers with a controlled MWD greater than 2.0. The method includes: supplying to a polymerization reactor a catalyst system feed stream and one or more additional feed streams comprising the one or more monomer(s), a diluent, or a combination thereof; and controlling a rate of supply of a polymorphogenate in at least one of the feed streams. The diluent can be one or more halogenated hydrocarbon(s). The catalyst system can include one or more Lewis acid(s) and one or more initiator(s) that is not the same as the rate-controlled polymorphogenate.

Another aspect of the disclosure can provide a polymerization system to polymerize one or more monomer(s) to form isoolefin polymers and copolymers with a controlled MWD greater than 2.0. The system can include: a reaction zone to polymerize the one or more monomer(s) in a polymerization medium comprising the one or more monomer(s), a diluent and a catalyst system; a monomer feed line to supply the one or more monomer(s) and diluent to the polymerization medium in the reaction zone; a separate catalyst feed line to supply one or more Lewis acid(s) to the polymerization medium in the reaction zone; and a system for adjusting (e.g., a control loop) a feed rate of the one or more polymorphogenate(s) to the reaction zone. The diluent can be one or more halogenated hydrocarbon(s). The catalyst system can include one or more Lewis acid(s) and a plurality of modifiers comprising one or more polymorphogenate(s) and one or more initiator(s).

In an embodiment, the system can also include a product line to recover a mixture of polymer and diluent from the reaction zone, a polymer recovery unit to separate diluent from the mixture and recover the polymer, a diluent recovery unit to enrich the separated diluent, and a transfer line to recycle the enriched diluent to the monomer feed line. The polymerization system can also include a polymorphogenate supply line to introduce the one or more polymorphogenate (s) to the reaction zone, e.g. directly or via the monomer feed line, the catalyst feed line, or a combination thereof.

In an embodiment, the diluent recovery unit can include a fractionation operation, which can be an extractive distillation unit, to produce polymorphogenate-lean diluent for recycle. In another embodiment, the diluent recovery unit can include means for polymorphogenate removal.

In another embodiment, the control loop can include a polymorphogenate analyzer to determine polymorphogenate level in the monomer feed line, the catalyst feed line, or a combination thereof, and a flow controller in communication with the polymorphogenate analyzer and associated with the oxygenate supply line, e.g. to control a flow rate of the polymorphogenate supply line to achieve polymorphogenate desired level at the polymorphogenate analyzer. In an embodiment, the control loop can include a MWD analyzer to determine MWD of the recovered polymer, in communication with a flow controller to control a flow rate of the polymorphogenate supply line to achieve a MWD target input. Alternatively or additionally, the control loop can include a MWD analyzer to determine MWD of the recovered polymer, in communication with the flow controller to proportionally adjust the polymorphogenate desired level to achieve a MWD target.

In embodiments, the polymorphogenate supply line can be connected to the monomer feed line, and/or to the catalyst feed line, which can be connected to a reactor housing the reaction zone.

Another embodiment of the disclosure provides a catalyst system comprising a plurality of active catalyst complex species formed by combination of a Lewis acid, an initiator and a polymorphogenate. In an embodiment, the polymorphogenate can promote the formation of different active catalyst complex species having different polymerization rates, i.e. different rates of propagation, chain transfer, or termination, as observed by different polydispersities resulting from the presence of relatively different proportions of the polymorphogenate, especially in the slurry polymerization of isobutylene in a butyl reactor with methyl chloride diluent at −95° C. In one embodiment, the polymorphogenate is present in a substoichiometric proportion with respect to the Lewis acid.

In another embodiment of the present disclosure, there is provided an isobutylene polymer having a controlled MWD greater than 2.0 prepared using the catalyst and methods described above.

In an embodiment, the catalyst system modifiers further comprise a weakly-coordinating anion.

DRAWINGS

DETAILED DESCRIPTION

Figure 1:
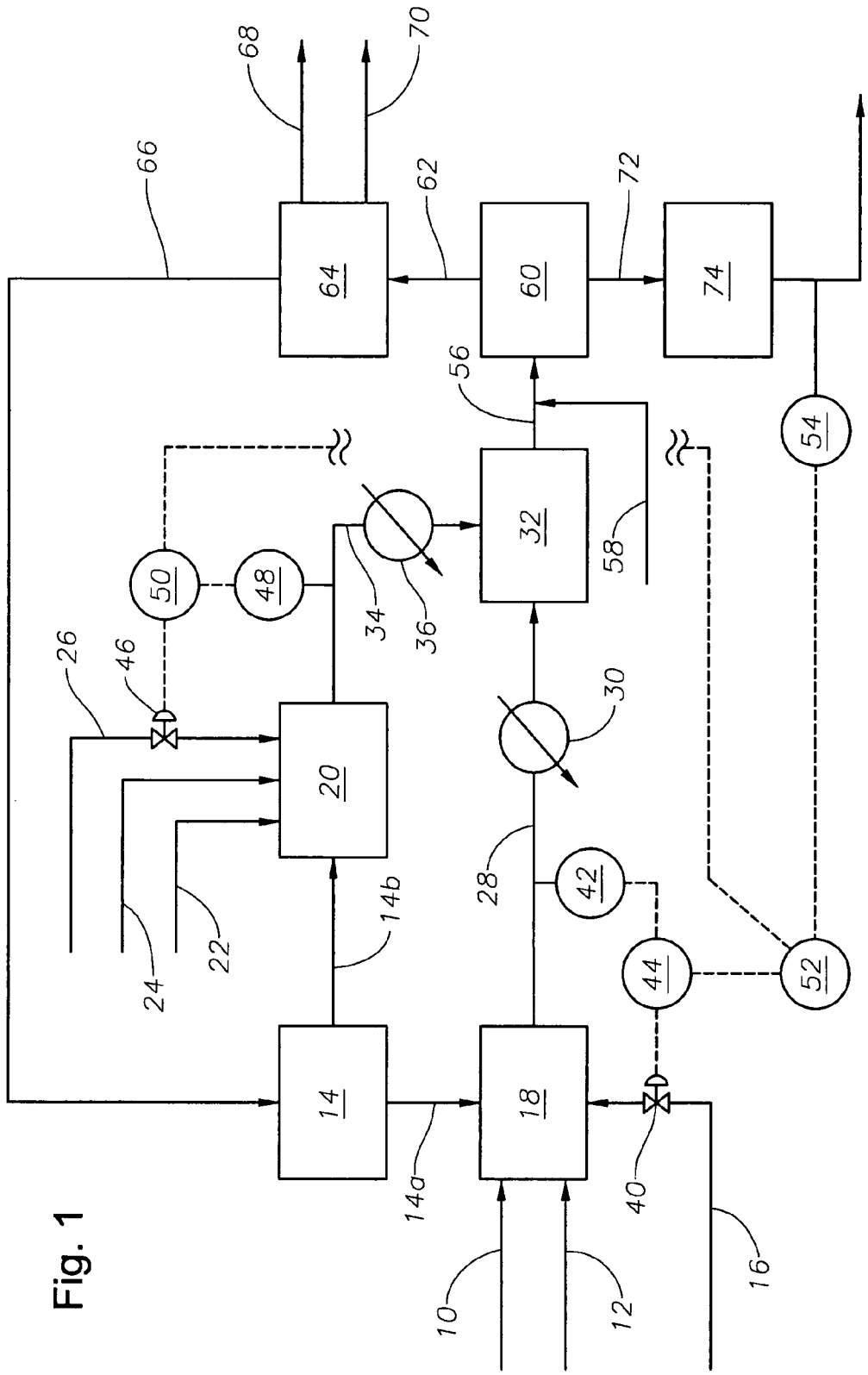
FIG. 1 is a schematic flow diagram of a polymerization system according to an embodiment of the disclosure.

As used herein, the new numbering scheme for the Periodic Table Groups are used as in CHEMICAL AND ENGINEERING NEWS, 63(5), 27 (1985).

For purposes of this disclosure and the claims thereto the term "catalyst system" refers to and includes any Lewis acid (s) or other metal complex(es) used to catalyze the polymerization of the olefinic monomers of the disclosure, as well as a plurality of catalyst modifiers including at least one polymorphogenate and at least one initiator, and optionally other minor catalyst component(s).

In one embodiment, the disclosure provides a method to polymerize one or more monomer(s) to form isoolefin polymers and copolymers with a controlled polydispersity, which is also known in the art as MWD, wherein the MWD is greater than 2.0, comprising polymerizing the one or more monomer (s) in a polymerization medium comprising the one or more monomer(s), a diluent and a catalyst system comprising a polymorphogenate and an initiator.

Polymerization media suitable to polymerize monomers to form a polymer relate to the selection of polymerization conditions and components, and it is within the ability of those skilled in the art to obtain the production of a desired polymer with the controlled MWD in light of process parameters and component properties described herein. There are numerous permutations of the polymerization process and variations in the polymerization system components available to produce the desired polymer attributes, including MWD. In preferred embodiments, such polymers include polyisobutylene homopolymers, isobutylene-isoprene (butyl rubber) copolymers, isobutylene and para-methylstyrene copolymers, and star-branched butyl rubber terpolymers.

"Diluent" means a diluting or dissolving agent. Diluent is specifically defined to include chemicals that can act as solvents for the Lewis acid, other metal complexes, initiators, monomers or other additives. In the practice of the disclosure, the pure diluent, apart from the polymorphogenate or impurities in the diluent that can modify the catalyst system, does not generally alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc. to any appreciable extent. Additionally, the term diluent includes mixtures of at least two or more diluents.

A "reactor" is any container(s) in which a chemical reaction occurs. The commercial butyl reactors typically used in embodiments are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CF-STR") is found in U.S. Pat. No. 5,417,930, incorporated by reference. In embodiments of these reactors, slurry can be circulated through tubes of a heat exchanger by a pump, while boiling ethylene on the shell side can provide cooling, and the slurry temperature can be determined by the boiling ethylene temperature, the required heat flux and the overall resistance to heat transfer.

"Slurry" refers to a volume of diluent comprising polymer that has precipitated from the diluent, monomers, Lewis acid, and initiator. The slurry concentration is the volume percent of the partially or completely precipitated polymers based on the total volume of the slurry.

"Polymer" may be used to refer to homopolymers, copolymers, interpolymers, terpolymers, etc. Likewise, a "copolymer" may refer to a polymer comprising at least two monomers, optionally with other monomers. When a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

"Isoolefin" refers to any olefin monomer having two substitutions on the same carbon. "Multiolefin" refers to any monomer having two double bonds. "Elastomer" or "elastomeric composition," as used herein, refers to any polymer or composition of polymers consistent with the ASTM D1566 definition. The terms may be used interchangeably with the term "rubber(s)," as used herein.

"Pseudohalogen" is defined herein to be an azide, an isocyanate, a thiocyanate, an isothiocyanate or a cyanide.

"Oxygenate" refers to oxo- or hydroxyl-substituted hydrocarbons or otherwise unsubstituted hydrocarbons containing an oxygen atom. The term "organic oxygenate" generally includes compounds consisting essentially of hydrogen, carbon and oxygen atoms such as alcohols, ethers, ketones, carboxylic acids, esters, aldehydes, epoxides, including monobasic and polybasic oxygenates, and also including the corresponding thio equivalents where one or more of the oxygen atoms is replaced by a sulfur atom. The term generally excludes compounds which do not have at least one carbon atom, one hydrogen atom and one oxygen atom, such as carbon monoxide, carbon dioxide, and water, and also excludes compounds containing non-organic elements other than hydrogen, carbon and oxygen, for example hydrocarbons substituted with other atoms such as metalloid or metal.

In one embodiment, this disclosure relates to the use of polymorphogenate(s) to produce a polymer with a controlled MWD. For example, the polymorphogenate(s) can be used with chlorinated hydrocarbon(s), hydrofluorocarbon(s), or blends of hydrofluorocarbon(s) with hydrocarbon(s) and/or chlorinated hydrocarbon(s) to polymerize and copolymerize isoolefins with dienes and/or alkylstyrenes to produce isoolefin homopolymers and copolymers with a controlled MWD.

In one embodiment, this disclosure relates to the discovery of new polymerization systems and processes using reactor feed stream(s) containing polymorphogenate(s). These polymorphogenates effectively modify the catalyst system to form a plurality of activated catalyst species which influence the MWD. Polymerization systems using these polymorphogenates can produce polymers having a controlled molecular weight and MWD. In addition, this disclosure further relates to the use of these polymorphogenates at controlled rates in polymerization systems for the preparation of high molecular weight polymers and copolymers with targeted molecular weight and MWD that is tightly controlled by the rate of the polymorphogenates used in the polymerization systems.

Monomers and Polymers

Monomers which may be polymerized by this system include any hydrocarbon monomer that is polymerizable using this disclosure. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, 3-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used a monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers listed herein. Examples of homopolymers include polyisobutylene, polypara-methylstyrene, polyisoprene, polystyrene, polyalpha-methylstyrene, polyvinyl ethers (such as polymethylvinylether, polyethylvinylether). Preferred polymers also include copolymers of 1) isobutylene and an alkylstyrene; and 2) isobutylene and isoprene.

In one embodiment butyl polymers are prepared by reacting a comonomer mixture, the mixture having at least (1) a $C_4$ to $C_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. One embodiment of the butyl rubber polymer of the disclosure is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment.

This disclosure further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably paramethyl styrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Lewis Acid

In a preferred embodiment the Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the disclosure. In one embodiment, the metals are aluminum, boron and titanium, with aluminum being desirable. Illustrative examples include $AlCl_3$, $(alkyl)AlCl_2$, $(C_2H_5)_2AlCl$, $(C_2H_5)_3Al_2Cl_3$, $BF_3$, $SnCl_4$ and $TiCl_4$. In a particularly preferred embodiment, $BF_3$ is not the chosen Lewis acid.

The Group 4, 5 and 14 Lewis acids have the general formula $MX_4$; wherein M is Group 4, 5, or 14 metal; and X is a halogen independently selected from the group consisting of fluorine, chlorine, bromine, and iodine, preferably chlorine. X may also be a psuedohalogen. Non-limiting examples include titanium tetrachloride, titanium tetrabromide, vanadium tetrachloride, tin tetrachloride and zirconium tetrachloride. The Group 4, 5, or 14 Lewis acids may also contain more than one type of halogen. Non-limiting examples include titanium bromide trichloride, titanium dibromide dichloride, vanadium bromide trichloride, and tin chloride trifluoride.

Group 4, 5 and 14 Lewis acids useful in this disclosure may also have the general formula $MR_nX_{4-n}$; wherein M is Group 4, 5, or 14 metal; wherein R is a monovalent hydrocarbon radical selected from the group consisting of $C_1$ to $C_{12}$ alkyl, aryl, arylalkyl, alkylaryl and cycloalkyl radicals; and n is an integer from 0 to 4; X is a halogen independently selected from the group consisting of fluorine, chlorine, bromine, and iodine, preferably chlorine. X may also be a psuedohalogen. Non-limiting examples include benzyltitanium trichloride, dibenzyltitanium dichloride, benzylzirconium trichloride, dibenzylzirconium dibromide, methyltitanium trichloride, dimethyltitanium difluoride, dimethyltin dichloride and phenylvanadium trichloride.

Group 4, 5 and 14 Lewis acids useful in this disclosure may also have the general formula $M(RO)_nR'_mX_{4-(m+n)}$; wherein M is Group 4, 5, or 14 metal, wherein RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals; n is an integer from 0 to 4 and m is an integer from 0 to 4 such that the sum of n and m is not more than 4; X is a halogen independently selected from the group consisting of fluorine, chlorine, bromine, and iodine, preferably chlorine. X may also be a psuedohalogen. Non-limiting examples include methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride and benzyl isopropoxyvanadium dichloride.

Group 5 Lewis acids useful in this disclosure may also have the general formula $MOX_3$; wherein M is a Group 5 metal; wherein X is a halogen independently selected from the group consisting of fluorine, chlorine, bromine, and iodine, preferably chlorine. A non-limiting example is vanadium oxytrichloride.

The Group 13 Lewis acids useful in this disclosure have the general formula $MX_3$; wherein M is a Group 13 metal and X is a halogen independently selected from the group consisting of fluorine, chlorine, bromine, and iodine, preferably chlorine. X may also be a psuedohalogen. Non-limiting examples include aluminum trichloride, boron trifluoride, gallium trichloride, and indium trifluoride.

Group 13 Lewis acids useful in this disclosure may also have the general formula: $MR_nX_{3-n}$ wherein M is a Group 13 metal; R is a monovalent hydrocarbon radical selected from the group consisting of $C_1$ to $C_{12}$ alkyl, aryl, arylalkyl, alkylaryl and cycloalkyl radicals; and n is an number from 0 to 3; X is a halogen independently selected from the group consisting of fluorine, chlorine, bromine, and iodine, preferably chlorine. X may also be a psuedohalogen. Non-limiting examples include ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum and triethylaluminum.

Group 13 Lewis acids useful in this disclosure may also have the general formula $M(RO)_nR'_mX_{3(m+n)}$; wherein M is a Group 13 metal; wherein RO is a monovalent hydrocarboxy radical selected from the group consisting of $C_1$ to $C_{30}$ alkoxy, aryloxy, arylalkoxy, alkylaryloxy radicals; R' is a monovalent hydrocarbon radical selected from the group consisting of $C_1$ to $C_{12}$ alkyl, aryl, arylalkyl, alkylaryl and cycloalkyl radicals; n is a number from 0 to 3 and m is an number from 0 to 3 such that the sum of n and m is not more than 3; X is a halogen independently selected from the group consisting of fluorine, chlorine, bromine, and iodine, preferably chlorine. X may also be a psuedohalogen. Non-limiting examples include methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride and phenoxy methylindium fluoride.

Group 13 Lewis acids useful in this disclosure may also have the general formula $M(RC=OO)_nR'_mX_{3-(m+n)}$; wherein M is a Group 13 metal; wherein RC=OO is a monovalent hydrocarbacyl radical selected from the group selected from the group consisting of $C_2$ to $C_{30}$ alkacyloxy, arylacyloxy, arylalkylacyloxy, alkylarylacyloxy radicals; R' is a monovalent hydrocarbon radical selected from the group consisting of $C_1$ to $C_{12}$ alkyl, aryl, arylalkyl, alkylaryl and cycloalkyl radicals; n is a number from 0 to 3 and m is a number from 0 to 3 such that the sum of n and m is not more than 3; X is a halogen independently selected from the group consisting of fluorine, chlorine, bromine, and iodine, preferably chlorine. X may also be a psuedohalogen. Non-limiting examples include acetoxyaluminum dichloride, benzoyloxyaluminum dibromide, benzoyloxygallium difluoride, methyl acetoxyaluminum chloride, and isopropoyloxyindium trichloride.

Particularly preferred Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the disclosure.

Polymorphogenates

Polymorphogenates in the present disclosure include any element or chemical compound that can modify or partially modify catalyst complexes in a carbocationic polymerization catalyst system comprising a Lewis acid and initiator to promote or mimic the formation of different active catalyst complex species having different polymerization rates. Different polymerization rates of the different catalyst complex species can be due to differences in the rate of propagation, chain transfer, termination reactions, or the like, as observed by different polydispersities resulting from the presence of relatively different proportions of the polymorphogenate. In the polymerization of isoolefin monomers with a Lewis acid and initiator in diluent, the rate of supply of the polymorphogenate to the polymerization media or reaction zone can be used as a control mechanism to modulate the molecular weight characteristics of the polymers produced, including MWD.

The polymorphogenate is preferably selected from molecular oxygen and chalcogenates, including organic oxygenates and corresponding thio compounds. Molecular oxygen can be added directly to the polymerization media, or with the aid of an oxygen solvent, adduct or adsorbent from which the oxygen can be readily released into the polymerization media.

Oxygenates useful in the present disclosure can include substituted and unsubstituted ethers, ketones, aldehydes, alcohols, esters, carboxylic acids, and the like. The oxygenate can have from 1 to 12 carbon atoms or more, preferably from 1 to 8 carbon atoms, more preferably from 2 to 5 carbon atoms. In one embodiment the oxygenates can include at least one nonionic oxygenate. In another embodiment the oxygenates can include at least one oxygenate that is not a Brønsted acid. Aldehydes, ethers and ketones, especially ethers and ketones, including combinations of an ether or ketone with an alcohol, are preferred oxygenates.

Suitable ethers can have the general formula R1-O—R2 and Suitable ketones can have the general formula R1-C(O)—R2, wherein R1 and R2 are independently substituted or unsubstituted, saturated or unsaturated alkyl, aryl, alkaryl, or aralkyl, having from 1 to 8 carbon atoms, preferably from 1 to 4 carbon atoms. Representative substituents R1 and R2 can include methyl, ethyl, propyl, isopropyl, butyl, isobutyl, sec-butyl, pentyl, cyclopentyl hexyl, cyclohexyl, phenyl, and so on. In one embodiment, the oxygenate does not include tertiary alkyl or other ethers which can function as true initiators; in another embodiment, the plurality of modifiers does not include tertiary alkyl ethers. In one embodiment, the polymerization medium is essentially free of tertiary alkyl ethers, e.g. less than 5 wppm by weight of the polymerization medium. Specific representative ethers include dimethyl ether, diethyl ether, methylethyl ether, diisopropyl ether, methylisopropyl ether, ethylisopropyl ether, dipropyl ether, methylpropyl ether, ethylpropyl ether, isopropylpropyl ether, and so on.

In one embodiment, the polymerization medium is essentially free of alcohols and other oxygenates such as ionic oxygenates and/or oxygenates comprising a Brønsted acid that can function as true initiators, e.g. less than 5 wppm, preferably less than 2 wppm, by weight of the polymerization medium, or less than 0.001 moles per mole of Lewis acid(s). In this situation, the alcohol might have no effect on MWD, or could otherwise suppress or excessively increase the MWD effect of the ether or ketone, or other MWD-control polymorphogenate. In another embodiment, alcohols useful in one or more of the reactor feed stream(s) according to this disclosure, preferably in combination with another oxygenate such as an ether or ketone, include alcohols having from 1 to 12 carbon atoms, preferably from 1 to 8 carbon atoms, more preferably from 1 to 4 carbon atoms. Representative examples include methanol, ethanol, propanol, 2-propanol, 2-methylpropan-2-ol, cyclohexanol, and benzyl alcohol. Phenols useful in the feed stream according to this disclosure include phenol; 2-methylphenol; 2,6-dimethylphenol; p-chlorophenol; p-fluorophenol; 2,3,4,5,6-pentafluorophenol; and 2-hydroxynaphthalene. Diols, glycols and polyols are also suitable. The alcohols can be substituted or unsubstituted.

The polymorphogenate is preferably present in the monomer, catalyst or other feed stream in an amount that is effective to influence molecular weight or especially MWD, as compared to the polymerization without the alcohol. In one embodiment, the polymorphogenate is present in the polymerization medium in a proportion from a lower limit of 0.001, 0.005, 0.01, 0.02, or 0.05 up to an upper limit of 1.0, 0.5, or 0.2 moles of total polymorphogenate per mole of Lewis acid, or within any range from a specified lower limit to a specified upper limit. Alternatively, the polymorphogenate is employed at from 5 to 25 wppm by weight of the polymerization medium. If alcohol is employed as a co-polymorphogenate with an ether, ketone or other polymorphogenate, the alcohol(s) preferably is employed at a lower weight proportion than the ether, ketone or other oxygenate(s). If insufficient total polymorphogenate is employed, it will have little influence over the MWD. In some catalyst systems, as a higher proportion of total polymorphogenate is employed, the MWD can be broadened up to a point at which the polymorphogenate catalyst complex may begin to predominate over other catalyst species; with additional total polymorphogenate the MWD may begin to decline. The total polymorphogenate can be present in a range that is adjustable to control the MWD, preferably in a range where MWD increases proportionally to increases in total polymorphogenate, although ranges where MWD decreases in response to increases in the level of total polymorphogenate are also possible.

The polymorphogenate can also be selected from thio compounds corresponding to the foregoing oxygenates wherein one or more of the oxygen atoms is replaced by a sulfur atom. For example, thioethers (mercaptans) and dialkylthiocarbonyls can be suitably employed as polymorphogenic chalcogenates. The thio compounds can be employed alone or in combination with molecular oxygen or one or more oxygenates.

In embodiments, the one or more polymorphogenate(s) can be selected from oxygen and chalcogenates, such as, for example, organic oxygenates, corresponding thio compounds, and combinations thereof. The polymorphogenate(s) can be nonionic. In an embodiment, the polymorphogenate(s) is not a Brønsted acid. In an embodiment the polymorphogenate can be one or more organic oxygenate(s) selected from alcohols, ethers, ketones, esters, aldehydes, and carboxylic acids having from 1 to 12 carbon atoms. In another embodiment, the one or more organic oxygenate(s) can be selected from at least one ether, at least one ketone, or a combination thereof. The one or more organic oxygenate(s) can also include an alcohol. In other embodiments, the one or more organic oxygenate(s) has from 1 to 8 carbon atoms, or from 1 to 4 carbon atoms.

In an embodiment, the one or more organic oxygenate(s) is selected from dimethyl ether, diethyl ether, methylethyl ether, diisopropyl ether, methylpropyl ether, ethylpropyl ether, dipropyl ether, methylpropyl ether, ethylpropyl ether, isopropylpropyl ether, acetone, and methylethyl ketone.

In an embodiment, the one or more organic oxygenate(s) comprises an alcohol selected from methanol, ethanol, propanol, isopropanol, butanol isomers, and isobutanol isomers.

In another embodiment, the one or more oxygenate(s) is selected from methanol, dimethyl ether, acetone, diethyl ether, diisopropyl ether, and methyl ethyl ketone.

In another embodiment, the one or more polymorphogenate(s) can be a thio compound corresponding to any of the aforementioned organic oxygenates wherein one or more of the oxygen atoms are replaced by a sulfur atom.

In embodiments, the one or more polymorphogenate(s) is present in the polymerization medium in an amount to provide a molar ratio of polymorphogenate to Lewis acid less than 1, from 0.01 up to 0.5, or from 0.05 up to 0.2. In another embodiment, the controlled polymorphogenate(s) is present in an amount to provide a molar ratio of organic oxygenate to total initiator from 0.01 to 0.5, preferably 0.05 to 0.2.

Initiator

Initiators useful in this disclosure are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), alkyl halides, such as $(CH_3)_3CCl$, $C_6H_5C(CH_3)_2Cl$, (2-chloro-2,4,4-trimethylpentane) and 2-chloro-2-methylpropane. More recently, transition metal complexes, such as metallocenes and other such materials that can act as single site catalyst systems, such as when activated with weakly coordinating Lewis acids or Lewis acid salts have been used to initiate isobutylene polymerization.

In an embodiment, the one or more initiator(s) comprises at least one non-oxygenate. In another embodiment, the one or more initiator(s) can be independently selected from the group consisting of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, and arylalkylacid halide.

In another embodiment, the one or more initiator(s) is independently selected from the group consisting of hydrogen chloride, hydrogen bromide, hydrogen iodide, 1-chloroacetic acid, dichloroacetic acid, trichloroacetic acid, trifluoroacetic acid, p-chlorobenzoic acid, p-fluorobenzoic acid, acetyl chloride, acetyl bromide, cinnamyl chloride, benzoyl chloride, benzoyl bromide, trichloroacetylchloride, trifluoroacetylchloride, p-fluorobenzoylchloride, methanesulfonic acid, trifluoromethanesulfonic acid, trichloromethanesulfonic acid, p-toluenesulfonic acid, methanesulfonyl chloride, methanesulfonyl bromide, trichloromethanesulfonyl chloride, trifluoromethanesulfonyl chloride, p-toluenesulfonyl chloride, p-chlorophenol, p-fluorophenol, and 2,3,4,5,6-pentafluorophenol.

In one embodiment, the reactor and the catalyst system are substantially free of water. "Substantially free of water" is defined as less than 30 wppm (based upon total weight of the catalyst system), preferably less than 20 wppm, preferably less than 10 wppm, preferably less than 5 wppm, preferably less than 1 wppm. However, when water is selected as an initiator, it is added to the catalyst system to be present at greater than 30 wppm, preferably greater than 40 wppm, and even more preferably greater than 50 wppm (based upon total weight of the catalyst system).

In a preferred embodiment the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide. In one embodiment, the selected initiator is not a chalcogenate, e.g. an oxygenate or a corresponding thio compound. "Substantially absent" in reference to initiator chalcogenates or a particular genus or species thereof in the catalyst system is defined herein as a molar ratio of the initiator chalcogenate to Lewis acid less than 0.05, preferably less than 5 wppm based upon total weight of the polymerization medium, especially less than 1 wppm. In an embodiment, ionic chalcogenate initiators are substantially absent, and in another embodiment chalcogenate initiators that are Brønsted acids are substantially absent.

Preferred hydrogen halide initiators include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful as initiators in this disclosure include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid. In one embodiment, carboxylic acids are substantially absent from the catalyst system.

Carboxylic acid halides useful in this disclosure are similar in structure to carboxylic acids with the substitution of a halide for the OH of the acid. The halide may be fluoride, chloride, bromide, or iodide, with the chloride being preferred. Preparation of acid halides from the parent carboxylic acids are known in the prior art and one skilled in the art should be familiar with these procedures. Carboxylic acid halides useful in this disclosure include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride. In one embodiment, carboxylic acid halides are substantially absent from the catalyst system.

Sulfonic acids useful as initiators in this disclosure include both aliphatic and aromatic sulfonic acids. Examples of preferred sulfonic acids include methanesulfonic acid, trifluoromethanesulfonic acid, trichloromethanesulfonic acid and p-toluenesulfonic acid. In one embodiment, sulfonic acids are substantially absent from the catalyst system.

Sulfonic acid halides useful in this disclosure are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this disclosure include methanesulfonyl chloride, methanesulfonyl bromide, trichloromethanesulfonyl chloride, trifluoromethanesulfonyl chloride and p-toluenesulfonyl chloride. In one embodiment, sulfonic acid halides are substantially absent from the catalyst system.

When used in the catalyst system, alcohols useful as initiators in this disclosure include methanol, ethanol, propanol, 2-propanol, 2-methylpropan-2-ol, cyclohexanol, and benzyl alcohol. Phenols useful in this disclosure include phenol; 2-methylphenol; 2,6-dimethylphenol; p-chlorophenol; p-fluorophenol; 2,3,4,5,6-pentafluorophenol; and 2-hydroxynaphthalene. In one embodiment, alcohols are substantially absent from the catalyst system.

Preferred tertiary alkyl and aralkyl initiators include tertiary compounds represented by the formula below:

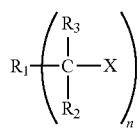

wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms; and n is the number of initiator sites and is a number greater than or equal to 1, preferably between 1 to 30, more preferably n is a number from 1 to 6. The arylalkyls may be substituted or unsubstituted. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1,4-bis(1-chloro-1-methylethyl)benzene; 5-tert-butyl-1,3-bis(1-chloro-1-methylethyl)benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl)benzene; 5-tert-butyl-1,3-bis(1-acetoxy-1-methylethyl)benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1-methylethylbenzene; 1-methoxyadamantane; 1-methoxyethylbenzene; 1,4-bis(1-methoxy-1-methylethyl)benzene; 5-tert-butyl-1,3-bis(1-methoxy-1-methylethyl)benzene and 1,3,5-tris(1-chloro-1-methylethyl)benzene. Other suitable initiators can be found in U.S. Pat. No. 4,946,899, which is herein incorporated by reference.

Another preferred initiator is a polymeric halide, one of $R_1$, $R_2$ or $R_3$ is an olefin polymer and the remaining R groups are defined as above. Preferred olefin polymers include polyisobutylene, polypropylene, and polyvinylchloride. The polymeric initiator may have halogenated tertiary carbon positioned at the chain end or along or within the backbone of the polymer. When the olefin polymer has multiple halogen atoms at tertiary carbons, either pendant to or within the polymer backbone, the product may contain polymers which have a comb like structure and/or side chain branching depending on the number and placement of the halogen atoms in the olefin polymer. Likewise, the use of a chain end tertiary polymer halide initiator provides a method for producing a product which may contain block copolymers.

Particularly preferred initiators may be any of those useful in cationic polymerization of isobutylene copolymers including: hydrogen chloride, 2-chloro-2,4,4-trimethylpentane, 2-chloro-2-methylpropane, 1-chloro-1-methylethylbenzene, and methanol.

Catalyst system compositions useful in this disclosure typically comprise (1) a Lewis acid co-initiator and (2) at least two modifiers including at least one initiator (which may be a polymorphogenate) and at least one polymorphogenate (which may be an initiator), provided that when the initiator comprises polymorphogenate (or, stated differently, when the polymorphogenate is an initiator), the catalyst system includes a second initiator, preferably a nonchalcogenate initiator and especially a non-oxygenate initiator, preferably at a higher molar concentration than the polymorphogenate-initiator. In a preferred embodiment, the Lewis acid coinitiator is present anywhere from about 0.1 moles times the total moles of initiator present to about 200 times the moles of initiator present. In a further preferred embodiment, the Lewis acid coinitiator is present at anywhere from about 0.8 times the total moles of initiator present to about 20 times the moles of initiator present. In a preferred embodiment the initiator is present at anywhere from about 0.1 moles per liter to about $10^{-6}$ moles per liter. It is of course understood that greater or lesser amounts of initiator are still within the scope of this disclosure.

The amount of the catalyst employed will depend on desired molecular weight and MWD of the polymer being produced. Typically the range will be from about $1 \times 10^{-6}$ moles per liter to $3 \times 10^{-2}$ moles per liter and most preferably from $10^{-4}$ to $10^{-3}$ moles per liter.

Catalyst systems useful in this disclosure may further comprise a catalyst composition comprised of a reactive cation and a weakly-coordinating anion ("WC anion" or "WCA" or "NCA"). The catalyst composition comprising the WC anion will include a reactive cation and in certain instances are novel catalyst systems.

A weakly-coordinating anion is defined as an anion which either does not coordinate to the cation or which is weakly coordinated to the cation and when the anion is functioning as the stabilizing anion in this disclosure the WCA does not transfer an anionic fragment or substituent to the cation thus creating a neutral by-product or other neutral compound. Preferred examples of such weakly-coordinating anions include: alkyltris(pentafluorophenyl) boron $(RB(Pfp)_3^-)$, tetraperfluorophenylboron $(B(Pfp)_4^-)$, tetraperfluorophenylaluminum carboranes, halogenated carboranes and the like. The cation is any cation that can add to an olefin to create a carbocation.

The anion may be combined with the cation by any method known to those of ordinary skill in the art. For example in a preferred embodiment the WC anion is introduced into the diluent as a compound containing both the anion and the cation in the form of the active catalyst system. In another preferred embodiment a composition containing the WC anion fragment is first treated to produce the anion in the presence of the cation or reactive cation source, i.e. the anion is activated. Likewise the WC anion may be activated without the presence of the cation or cation source which is subsequently introduced. In a preferred embodiment a composition containing the anion and a composition containing the cation are combined and allowed to react to form a by-product, the anion and the cation. In various preferred embodiments of this disclosure the WC anion is combined with one or more cations that are selected from different classes of cations and cation sources. Some preferred classes are substituted carbocation, substituted silylium, compositions capable of generating a proton, and so on.

Preferred examples of substituted carbocations include substances that are represented by the formula:

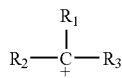

wherein $R_1$, $R_2$ and $R_3$ are independently hydrogen, or a linear, branched or cyclic aromatic or aliphatic groups, preferably $C_1$ to $C_{30}$ alkyl, aryl, aralkyl groups or derivatives thereof, preferably a $C_1$ to $C_{20}$ aromatic or aliphatic group, provided that only one of $R_1$, $R_2$ or $R_3$ may be hydrogen. In a preferred embodiment none of $R_1$, $R_2$ or $R_3$ are H. Preferred aromatics include phenyl, tolyl, xylyl, biphenyl and the like. Preferred aliphatics include methyl, ethyl, propyl, butyl, pentyl, hexyl, octyl, nonyl, decyl, dodecyl, 3-methylpentyl, 3,5,5-trimethylhexyl and the like. In a particularly preferred embodiment, when $R_1$, $R_2$ and $R_3$ are phenyl groups, the addition of an aliphatic or aromatic alcohol significantly enhances the polymerization of isobutylene.

In another preferred embodiment, substituted silylium compositions, preferably trisubstituted silylium compositions are combined with WCA's to polymerize monomers. Preferred silylium cations are those represented by the formula:

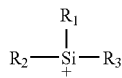

wherein $R_1$, $R_2$ and $R_3$, are independently hydrogen, or a linear, branched or cyclic aromatic or aliphatic group, with the proviso that only one of $R_1$, $R_2$ and $R_3$ may be hydrogen. Preferably, none of $R_1$, $R_2$ and $R_3$ is H. Preferably, $R_1$ $R_2$ and $R_3$ are, independently, $C_1$ to $C_{30}$ alkyl, aryl, aralkyl groups or derivatives thereof, preferably a $C_1$ to $C_{20}$ aromatic or aliphatic group. More preferably, $R_1$, $R_2$ and $R_3$ are independently a $C_1$ to $C_8$ alkyl group. Examples of useful aromatic groups may be selected from the group consisting of phenyl, tolyl, xylyl and biphenyl. Non-limiting examples of useful aliphatic groups may be selected from the group consisting of methyl, ethyl, propyl, butyl, pentyl, hexyl, octyl, nonyl, decyl, dodecyl, 3-methylpentyl and 3,5,5-trimethylhexyl. A particularly preferred group of reactive substituted silylium cations may be selected from the group consisting of trimethylsilylium, triethylsilylium and benzyldimethylsilylium.

For a discussion of stable forms of the substituted silylium and synthesis thereof, see F. A. Cotton, G. Wilkinson, Advanced Inorganic Chemistry, John Wiley and Sons, New York 1980. Likewise for stable forms of the cationic tin, germanium and lead compositions and synthesis thereof, see Dictionary of Organometallic compounds, Chapman and Hall New York 1984.

A third source for the cation is any compound that will produce a proton when combined with the weakly-coordinating anion or a composition containing a weakly-coordinating anion. Protons may be generated from the reaction of a stable carbocation salt which contains a weakly-coordinating, non-nucleophilic anion with water, alcohol or phenol present to produce the proton and the corresponding by-product, (ether in the case of an alcohol or phenol and alcohol in the case of water). Such reaction may be preferred in the event that the reaction of the carbocation salt is faster with the protonated additive as compared with its reaction with the olefin. Other proton generating reactants include thiols, carboxylic acids, and the like. Similar chemistries may be realized with silylium type catalysts. In a particularly preferred embodiment, when $R_1$, $R_2$ and $R_3$ are phenyl groups, the addition of an aliphatic or aromatic alcohol significantly enhances the polymerization of isobutylene.

Another method to generate a proton comprises combining a group 1 or group 2 metal, preferably lithium, with water, such as by means of in a wet diluent, in the presence of a Lewis base that does not interfere with polymerization, such as an olefin. It has been observed that when a Lewis base, such as isobutylene, is present with the group 1 or 2 metal and the water, a proton is generated. In a preferred embodiment the weakly-coordinating anion is also present in the "wet" diluent such that active catalyst is generated when the group 1 or 2 metal is added.

Diluents

Suitable diluents in the present disclosure include halogenated hydrocarbons, especially chlorinated and/or fluorinated hydrocarbons and the like. Specific examples include but are not limited to the halogenated versions of propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, and meta-xylene, preferably the chlorinated versions of the above, more preferably fluorinated versions of all of the above. Brominated versions of the above are also useful. Specific examples include methyl chloride, methylene chloride, ethyl chloride, propyl chloride, butyl chloride, chloroform and the like.

Hydrofluorocarbons are preferably used as diluents in the present disclosure, alone or in combination with other hydrofluorocarbons or in combination with other diluents such as chlorinated hydrocarbons. For purposes of this disclosure and the claims thereto, "hydrofluorocarbons" ("HFC's" or "HFC") are defined to be saturated or unsaturated compounds consisting essentially of hydrogen, carbon and fluorine, provided that at least one carbon, at least one hydrogen and at least one fluorine are present.

In certain embodiments, the diluent comprises hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one. In an embodiment, the diluent can be independently selected from the group consisting of fluoromethane, difluoromethane, trifluoromethane, 1,1-difluoroethane, 1,1,1-trifluoroethane, 1,1,1,2-tetrafluoroethane, and mixtures thereof. The diluent can comprise from 15 to 100 volume % HFC based upon the total volume of the diluent in one embodiment.

In one embodiment, the diluent comprises non-perfluorinated compounds or the diluent is a non-perfluorinated diluent. Perfluorinated compounds being those compounds consisting of carbon and fluorine. However, in another embodiment, when the diluent comprises a blend, the blend may comprise perfluorinated compound, preferably, the catalyst, monomer, and diluent are present in a single phase or the aforementioned components are miscible with the diluent as described in further detail below. In another embodiment, the blend may also comprise chlorofluorocarbons (CFC's), or those compounds consisting of chlorine, fluorine, and carbon.

In another embodiment, when higher weight average molecular weights (Mw) (typically greater than 10,000 Mw, preferably more than 50,000 Mw, more preferably more than 100,000 Mw) are desired, suitable diluents include hydrofluorocarbons with a dielectric constant of greater than 10 at −85° C., preferably greater than 15, more preferably greater than 20, more preferably greater than 25, more preferably 40 or more. In embodiments where lower molecular weights (typically lower than 10,000 Mw, preferably less than 5,000 Mw, more preferably less than 3,000 Mw) are desired the dielectric constant may be less than 10, or by adding larger amounts of initiator or transfer agent when the dielectric constant is above 10. The dielectric constant of the diluent $\in_D$ is determined from measurements of the capacitance of a parallel-plate capacitor immersed in the diluent [measured value $C_D$], in a reference fluid of known dielectric constant $\in_R$ [measured value $C_R$], and in air ($\in_A=1$) [measured value $C_A$]. In each case the measured capacitance $C_M$ is given by $C_M=\in C_C+C_S$, where $\in$ is the dielectric constant of the fluid in which the capacitor is immersed, $C_C$ is the cell capacitance, and $C_S$ is the stray capacitance. From these measurements $\in_D$ is given by the formula $\in_D=((C_D-C_A)\in_R+(C_R-C_D))/(C_R-C_A)$. Alternatively, a purpose-built instrument such as the Brookhaven Instrument Corporation BIC-870 may be used to measure dielectric constant of diluents directly.

In other embodiments, one or more HFC's are used in combination with another diluent or mixtures of diluents. Suitable additional diluents include hydrocarbons, especially hexanes and heptanes, halogenated hydrocarbons, especially chlorinated hydrocarbons and the like. Specific examples include those mentioned above.

In one embodiment, the HFC is used in combination with a chlorinated hydrocarbon such as methyl chloride. Additional embodiments include using the HFC in combination with hexanes or methyl chloride and hexanes. In another embodiment the HFC's are used in combination with one or more gases inert to the polymerization such as carbon dioxide, nitrogen, hydrogen, argon, neon, helium, krypton, zenon, and/or other inert gases that are preferably liquid at entry to the reactor. Preferred gases include carbon dioxide and/or nitrogen.

In another embodiment the HFC's are used in combination with one or more nitrated alkanes, including $C_1$ to $C_{40}$ nitrated linear, cyclic or branched alkanes. Preferred nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

When employed in the diluent, the HFC is typically present at 1 to 100 volume percent based upon the total volume of the diluents, alternatively from a lower limit of 5, 10, 15, 20, 25, 30, 35, 40, 45, 50, 55, 60, 65, 70, 75, 80, 85, 90, 95, 97, 98, or 99 volume percent. In a preferred embodiment the HFC is blended with one or more chlorinated hydrocarbons. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another embodiment the diluent or diluent mixture is selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. In some embodiments, the diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In a preferred embodiment, the diluent or diluent mixture is selected such that the difference between the measured glass transition temperature Tg of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC). Techniques are well described in the literature, for example, B. Wunderlich, "The Nature of the Glass Transition and its Determination by Thermal Analysis", in *Assignment of the Glass Transition*, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80° C. until immediately before the DSC measurement. Preferably the Tg values of the diluent-free and diluent-soaked polymers are within 12° C. of each other, preferably within 11° C., 10° C., 9° C., 8° C., 7° C., 6° C., 5° C., 4° C., 3° C., 2° C., or 1° C. of each other.

In an embodiment, the diluent has a dielectric constant at 20° C. greater than 6, greater than 9, or greater than 10. In another embodiment, the diluent has a dielectric constant at −85° C. greater than 20, greater than 25, or greater than 40.

In another embodiment, the diluent can be selected from chlorinated hydrocarbons, for example, ethyl chloride, methyl chloride, methylene chloride, $CHCl_3$, $CCl_4$, n-butyl chloride, chlorobenzene, and mixtures thereof. In an embodiment, the diluent is methyl chloride.

In other embodiments, the diluent can also include a hydrocarbon, a non-reactive olefin and/or an inert gas.

Polymerization Process

FIG. 1 is a schematic flow diagram of a polymerization system or process according to an embodiment of the disclosure. Isobutylene in line 10, comonomer(s) in line 12, diluent 14a from storage 14 and any polymorphogenate in line 16 are blended in feed blend unit 18. Feed blend unit 18 is conventional except in respect of the polymorphogenate addition. As is known in the art, it is typical to dry and fractionate the isobutylene and/or comonomer(s) if necessary to remove impurities in advance of the feed blend unit 18. The catalyst preparation unit 20 generally includes conventional apparatus for mixing the initiator 22 and Lewis acid 24, and diluting the catalyst complex with the desired amount of diluent 14b from diluent storage 14. If desired, polymorphogenate may optionally be introduced into the catalyst preparation unit 20 via line 26.

Monomer is fed from feed blend unit 18 via line 28, optionally through chiller 30, and then to polymerization reactor 32. Catalyst complex is similarly fed from catalyst preparation unit 20 via line 34, optionally through chiller 36, to the reactor 32. The disclosure may be practiced in continuous and batch processes. Further the reactor 32 can be a plug flow reactor and/or stirred tank reactors. Chillers 30 and 36 are optional and can be used upstream or downstream from the feed blend unit 18 and/or catalyst preparation unit 20.

Polymorphogenate feed to the reactor 32 can be via monomer feed blending unit 18, via catalyst preparation unit 20, or a combination thereof. Further, the polymorphogenate level or rate can be monitored in any one or more of the feed lines to or from the feed blend unit 18 or the catalyst preparation unit 20, for example, any one or more of lines 10, 12, 14a, 14b, 22, 24, 28 and 34, or via a separate line (not shown) to the reactor 32. In one illustrated embodiment in FIG. 1, the polymorphogenate is added via line 16 to the feed blending unit 18. The line 16 can include a flow control valve 40, and the associated flow control loop can include polymorphogenate flow or rate transmitter 42 and flow controller 44. In another illustrated embodiment in FIG. 1, the polymorphogenate is alternatively or additionally added via line 26 to the catalyst preparation unit 20. The line 26 can include a flow control valve 46, and the associated flow control loop can include a polymorphogenate flow or rate transmitter 48 and flow controller 50. Flow control loops are well known in the art. The polymorphogenate rate transmitter can include an online analyzer such as a gas chromatograph (GC) and a flow meter.

The flow control loops can be operated to adjust the flow rate of polymorphogenate 16, 26 to match a respective desired level for the rate transmitter 42, 48, e.g. if the polymorphogenate rate is below the desired level, the corresponding control valve 40, 46 is opened to increase the polymorphogenate flow rate. The polymorphogenate flow rate desired level can be entered manually or automatically as part of an MWD controller 52 or a distributed or centralized process control system. The polymorphogenate flow rate desired level can be determined and adjusted based on feedback from analysis of the polymer produced, to obtain the desired MWD of the polymer, for example, the polymorphogenate feed rate might be increased to broaden the MWD or decreased to lower the MWD. The MWD can be determined by sampling and laboratory analysis with data input by an operator or via a communications link between the analyzer and the MWD controller 52; or determined online via MWD transmitter 54 from an online analysis at any convenient downstream location at which an appropriate sample can be obtained.

The polymer-containing effluent 56 from the reactor 32 can if desired be quenched by a quench medium such as steam and/or hot water introduced via line 58. The polymer is then separated from the slurry in polymer recovery unit 60, using the heat from the quench medium to vaporize diluent and unreacted monomers in a flash tank or stripper, for example. The vapor stream 62 is then dried and fractionated in diluent recovery unit 64 to obtain diluent recycle 66, recovered monomer 68, which may also be recycled, and one or more polymorphogenate or waste stream(s) 70. It is also possible for all or part of the polymorphogenate to be produced with the diluent recycle 66 and recovered monomer 68, provided there is a purge or bleed mechanism to prevent excessive levels from accumulating in the process. For example, some or all of the polymorphogenate can be extracted with the quench medium and/or polymer. In one embodiment, the polymer recovery unit 60 is operated to control a partition of the polymorphogenate between the vapor stream 62 and liquid quench medium by maintaining the appropriate pressure and temperature conditions. The recovered polymer is transferred via line 72 for finishing operation 74 which can remove residual diluent, monomers, and quench medium using a series of screens and extruders, followed by compression into bales, wrapping and packaging in containers as desired. Apparatus and methods for polymer recovery 60, diluent recovery 64 and polymer finishing 74 are well known in the art.

In some embodiments, this disclosure may be practiced in "butyl reactors". Illustrative examples of reactor 32 can be selected from the group consisting of a continuous flow stirred tank reactor, a plug flow reactor, a moving belt or drum reactor, a jet or nozzle reactor, a tubular reactor, and an autorefrigerated boiling-pool reactor. The reactor can be operated on a continuous or semicontinuous basis. The polymer can have MWD less than 6, or between 2.5 and 5.

In another aspect, heat can be removed from the reactor 32 by use of heat transfer surfaces, such as in a tubular reactor where a coolant is on one side of the tube and the polymerizing mixture is on the other side. Heat may also be removed by evaporating the polymerizing mixture, such as may be found in an autorefrigerated boiling pool type reactor. Another example is a plug flow reactor where a portion of the polymerizing mixture is evaporated as the mixture proceeds through the reactor. Another example is where heat is removed in a plug flow reactor through surface heat transfer using coolant on the other side of a heat transfer surface. Another example would be a reactor where polymerization takes place on a moving belt or drum where the diluent/monomer/catalyst mixture is sprayed onto the belt or drum and heat is removed by evaporation of the diluent as the reaction proceeds. In addition heat may be removed in such reactors by surface heat transfer (such as where the coolant is present on the inside of the drum or under the belt and the polymer is produced on the other side of the belt or drum). Another type of reactor 32 is a jet or nozzle reactor. These reactors have a short residence time where the monomer feed in line 28 and catalyst complex in line 34 are combined in the jet or nozzle and the polymerization occurs as the mixture passes through the nozzle at high velocity.

Preferred reactor 32 includes a continuous flow stirred tank reactor, whether operating in batch or continuous mode, and whether operating in a tank with an agitator or in a tube type reactor. Preferred reactor 32 also includes a reactor where the polymerization occurs on one side of a heat transfer surface and the coolant is present on the other side. An example is a reactor where tubes containing coolant run inside the reactor polymerization zone. Another example would be where the polymerization occurs inside a tube and the coolant is present on the outside of the tube in a shell.

This disclosure may also be practiced in batch reactors where the monomers, diluent, catalyst and oxygenate are charged to the reactor 32 and then polymerization proceeds to completion (such as by quenching) and the polymer is then recovered.

The reacted monomers within the reactor 32 form part of a slurry. In one embodiment, the concentration of the solids in the slurry is equal to or greater than 10 vol %, and in other embodiments equal to or greater than 25 vol %, less than or equal to 75 vol %, or in a range from 1 to 70 vol %, 5 to 70 vol %, 10 to 70 vol %, 15 to 70 vol %, 20 to 70 vol %, 25 to 70 vol %, 30 to 70 vol %, or 40 to 70 vol %.

Typically, a continuous flow stirred tank-type reactor 32 may be used. The reactor 32 is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes at the termini of lines 28 and 34) for monomers, diluents, catalysts and polymorphogenate (combined or separately), temperature sensing means, and an effluent overflow or outflow pipe which withdraws polymer, diluent and unreacted monomers among other things, to a holding drum or quench tank (not shown). Preferably, the reactor 32 is purged of air and moisture. One skilled in the art will recognize proper assembly and operation.

The reactor 32 is preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

Other reactors that may be utilized in the practice of the present disclosure include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor 32 will contain sufficient amounts of the catalyst system of the present disclosure including oxygenate effective to catalyze the polymerization of the monomer containing feed-stream such that a sufficient amount of polymer having desired characteristics is produced. The feed-stream 28 in one embodiment contains a total monomer concentration greater than 5 wt % (based on the total weight of the monomers, diluent, oxygenate and catalyst system), preferably greater than 15 wt %, and greater than 30 wt % in another embodiment. In yet another embodiment, the feed-stream 28 will contain from 5 wt % to 50 wt % monomer concentration based on the total weight of monomer, diluent, polymorphogenate and catalyst system.

The reaction conditions will be such that desirable temperature, pressure and residence time are effective to maintain the reaction medium in the liquid state and to produce the desired polymers having the desired characteristics. The monomer feed-stream 28 is typically substantially free of any impurity which is adversely reactive with the catalyst under the polymerization conditions. For example, in some embodiments, the monomer feed 28 preferably should be substantially free of bases (such as caustic), and if they are not used as controlled polymorphogenates, sulfur-containing compounds (such as $H_2S$, COS, and organo-mercaptans, e.g., methyl mercaptan, ethyl mercaptan), nitrogen-containing bases, other oxygenates containing bases such as alcohols and the like. However monomer feed 28 may be less pure, typically not less than 95% based on total olefinic content by weight of the monomers supplied via lines 10 and 12, more preferably not less than 98%, not less than 99%. In preferred embodiments the impurities are present at less than 10,000 wppm (by weight), preferably less that 500 wppm, preferably less than 250 wppm, preferably less than 150 wppm, preferably less than 100 wppm, by weight of the monomers supplied via lines 10 and 12.

As is normally the case, reaction time, temperature, concentration, the nature of the reactants, and similar factors determine product molecular weights and MWD, especially herein the type and amount of polymorphogenate(s). The polymerization reaction temperature is conveniently selected based on the target polymer molecular weight and the monomer to be polymerized as well as standard process variable and economic considerations, e.g., rate, temperature control, etc. The temperature for the polymerization is less than 0° C., preferably between −10° C. and the freezing point of the slurry in one embodiment, and from −25° C. to −120° C. in another embodiment. In yet another embodiment, the polymerization temperature is from −40° C. to −100° C., and from −70° C. to −100° C. in yet another embodiment. In yet another desirable embodiment, the temperature range is from −80° C. to −100° C. In other embodiments, the temperature is equal to or less than 0° C., −10° C., −20° C., −30° C., −40° C., −50° C., −60° C., −70° C., −80° C., −90° C., or −100° C.

In a preferred embodiment, the polymerization temperature is within 10° C. above the freezing point of the diluent, preferably within 8° C. above the freezing point of the diluent, preferably within 6° C. above the freezing point of the diluent, preferably within 4° C. above the freezing point of the diluent, preferably within 2° C. above the freezing point of the diluent, preferably within 1° C. above the freezing point of the diluent. For the purposes of this disclosure and the claims thereto when the phrase "within X° C. above the freezing point of the diluent" is used it means the freezing point of the diluent plus X° C. For example if the freezing point of the diluent is −98° C., then 10° C. above the freezing point of the diluent is −88° C.

The reaction pressure can be from above 0 to 14,000 kPa in one embodiment (where 0 kPa is a total vacuum), or from 7 kPa to 12,000 kPa, from 100 kPa to 2000 kPa, from 200 kPa to 1500 kPa, from 200 kPa to 1200 kPa, from 200 kPa to 1000 kPa, from 7 kPa to 100 kPa, from 20 kPa to 70 kPa, from 40 kPa to 60 kPa, from 1000 kPa to 14,000 kPa, from 3000 kPa to 10,000 kPa, or from 3,000 kPa to 6,000 kPa in other embodiments.

The order of contacting the monomer feed-stream, catalyst, catalyst modifiers, including initiator and polymorphogenate, and diluent may vary from one embodiment to another. Consequently, different reaction conditions will produce products of different molecular weights.

In another embodiment, the initiator 22 and Lewis acid 24 are pre-complexed by mixing together with any polymorphogenate via line 26 in the selected diluent in any order for a prescribed amount of time ranging from 0.01 second to 10 hours, and then is injected into the continuous reactor 32 through a catalyst nozzle or injection apparatus. In yet another embodiment (not shown), Lewis acid 24 and the initiator 22 are added to the reactor 32 separately, with or without polymorphogenate via line 26 supplied with one or both thereof. In another embodiment (not shown), the initiator 22 is blended with the feed monomers in feed blend unit 18 before injection to the reactor 32. Desirably, the monomer is not contacted with either the Lewis acid 24, or Lewis acid 24 combined with initiator 22, before the monomers enter the reactor.

In an embodiment of the disclosure, the initiator 22 and Lewis acid 24, with or without polymorphogenate 26, preferably with polymorphogenate 26, are allowed to pre-complex by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In another embodiment of the disclosure, the initiator 22 and Lewis acid 24, with or without polymorphogenate 26, preferably with polymorphogenate 26, are allowed to pre-complex by mixing together in the selected diluent at temperatures between +80 and −150° C., typically between −40° C. and −98° C.

The overall residence time in the reactor 32 can vary, depending upon, e.g., catalyst activity and concentration, monomer concentration, feed injection rate, production rate, reaction temperature, and desired molecular weight, and generally will be between about a few seconds and five hours, and typically between about 10 and 60 minutes. Variables influencing residence time include the monomer and diluent feed injection rates and the overall reactor volume.

The catalyst (Lewis acid) to monomer ratio utilized will be those conventional in this art for carbocationic polymerization processes. In one embodiment of the disclosure, the monomer to catalyst mole ratios will typically be from 500 to 10000, and in the range of 2000 to 6500 in another embodiment. In yet another desirable embodiment, the ratio of Lewis acid to initiator is from 0.5 to 10, or from 0.75 to 8. The overall concentration of the initiator in the reactor is typically from 5 to 300 wppm or 10 to 250 wppm. The concentration of the initiator in the catalyst feed stream is typically from 50 to 3000 wppm in one embodiment. Another way to describe the amount of initiator in the reactor is by its amount relative to the polymer. In one embodiment, there is from 0.25 to 20 moles polymer/mole initiator, and from 0.5 to 12 mole polymer/mole initiator in another embodiment.

Catalyst efficiency (based on Lewis acid) in the reactor is maintained between 10,000 kilograms of polymer per kilogram of catalyst and 300 kilograms of polymer per kilogram of catalyst and desirably in the range of 4000 kilograms of polymer per kilogram of catalyst to 1000 kilograms of polymer per kilogram of catalyst by controlling the molar ratio of Lewis acid to initiator.

In one embodiment, the polymerization of cationically polymerizable monomers (such as polymerization of isobutylene and isoprene to form butyl rubber) comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst system and unreacted monomers through the reaction tubes. A feed-stream of the cationically polymerizable monomer(s) (such as isoprene and isobutylene) in a polar diluent is charged into the reactor, the feed-stream containing less than 0.0005 wt % of cation producing silica compounds, and typically free of aromatic monomers. The catalyst system is then charged into the reactor, the catalyst system having a Lewis acid and an initiator present in a molar ratio of from 0.50 to 10.0. Within the reactor, the feed-stream of monomers and catalyst system are allowed to contact one another, the reaction thus forming a slurry of polymer (such as butyl rubber), wherein the solids in the slurry has a concentration of from 20 vol % to 50 vol %. Finally, the thus formed polymer (such as butyl rubber) is allowed to exit the reactor through an outlet or outflow line while simultaneously allowing the feed-stream charging to continue, thus constituting the continuous slurry polymerization.

In one embodiment, the resultant polymer from one embodiment of the disclosure is a polyisobutylene/isoprene polymer (butyl rubber) that has a MWD of from about 2 to 5, and an unsaturation of from 0.5 to 2.5 moles per 100 mole of monomer. This product may be subjected to subsequent halogenation to afford a halogenated butyl rubber.

The polymers of the disclosure provide chemical and physical characteristics that make them highly useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of the disclosure make them ideal for rubber tire-curing bladders, high temperature service hoses, and conveyor belts for hot material handling. The polymers exhibit high damping and have uniquely broad damping and shock absorption ranges in both temperature and frequency. They are useful in molded rubber parts and find wide applications in automobile suspension bumpers, auto exhaust hangers, and body mounts.

The polymers of the instant disclosure are also useful in tire sidewalls and tread compounds. In sidewalls, the polymer characteristics impart good ozone resistance, crack cut growth, and appearance. The polymers of the disclosure may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant disclosure. Blends of the polymers of the disclosure with thermoplastic resins are used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers of the instant disclosure may also be blended with polyamides to produce other industrial applications.

The polymers of the instant disclosure may also be used as adhesives, caulks, sealants, and glazing compounds. They are also useful as plasticizers in rubber formulations with butyl, SBR, and natural rubber. In linear low density polyethylene (LLDPE) blends, they induce cling to stretch-wrap films. They are also widely employed in lubricants as dispersants and in potting and electrical cable filling materials. In certain applications, the polymers of the disclosure make them also useful in chewing-gum, as well as in medical applications such as pharmaceutical stoppers, and the arts for paint rollers.

The following examples reflect embodiments of the disclosure and are by no means intended to be limiting of the scope of the disclosure.

EXAMPLES

Polymerizations were conducted in a laboratory-scale continuous reactor constructed of stainless steel and designed to permit the introduction of monomer and catalyst feeds and the continuous removal of the polymer product. Mixing was provided by a three bladed impeller mounted on a stainless steel shaft and driver by an external electric motor. The motor was run at 1200 to 1600 rpm. The reactor was also equipped with a thermocouple to monitor the temperature of the reactor contents. The reactor was cooled to the desired reaction temperature, listed in the examples, by immersing the assembled reactor into a pentane or isohexane bath in an inert atmosphere glove box. The temperature of the stirred hydrocarbon bath was controlled to ±2° C. All apparatus in liquid contact with the reaction medium were dried at 120° C. and cooled in a nitrogen atmosphere before use. Isobutylene (Matheson or ExxonMobil) and methyl chloride (Air Gas) were dried by passing the gas through three stainless steel columns containing barium oxide and were condensed and collected as liquids in the glove box. Alternatively, methyl chloride was dried by the addition of triethylaluminum to the liquid at low temperature and subsequently distilling the methyl chloride from this solution under its own vapor pressure. 1,1,1,2-tetrafluoroethane (134a) (National Refrigerants) was dried by passing the gas through three stainless steel columns containing 3 Å molecular sieves and was condensed and collected as a liquid in the glove box. Isoprene (Aldrich) was either distilled prior to use or used as received. HCl solutions were prepared in either methyl chloride or 134a by dissolving gaseous HCl (Aldrich, 99% pure) into the condensed liquid at low temperature. The concentration of the HCl in these prepared solutions was determined by standard titration techniques. In the examples below, the diluent composition referred to as the "blend" is a 50/50 wt/wt mixture of 134a and methyl chloride.

Figure 2:
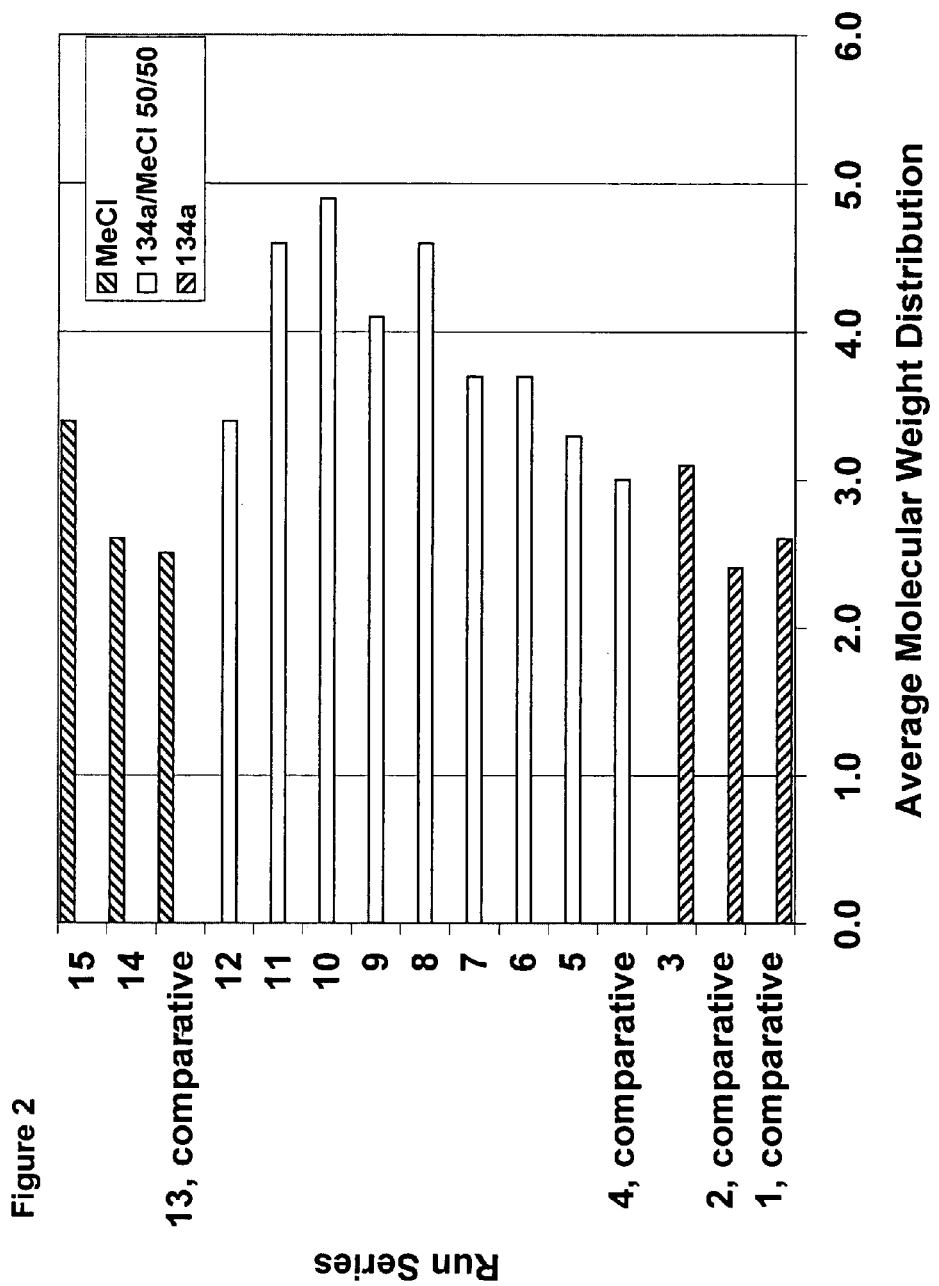
FIG. 2 is a graph comparing MWD of polymers prepared in polymerization media containing various oxygenates.

The slurry copolymerizations were performed by first preparing the monomer and catalyst feeds. The monomer feed was prepared in a glass or metal reservoir and comprised isobutylene, isoprene, the selected diluent and optionally an organic oxygenate(s). The monomer feed comprised 20 wt % isobutylene for Run Series 1 and 3 to 11. The monomer feed comprised 22 wt % isobutylene for Run Series 2 and 12 to 15. Isoprene was charged to the monomer feed at 2.8 mol % with respect to isobutylene. Methanol, when purposely added, was charged to the monomer feed in amounts sufficient to bring the total feed concentration to the values listed in the Table. Terms used in the Table and FIG. 2 are defined as follows: MeOH=methanol; DME=dimethyl ether; $Et_2O$=diethyl ether; DIPE=diisopropyl ether; MEK=methyl ethyl ketone; 134a=1,1,1,2-tetrafluoroethane; MeCl=methyl chloride; Blend=50/50 wt/wt mixture of 134a and MeCl; IB=isobutylene.

For Run Series 4 to 1, the methyl chloride used for the polymerization was dried by passing the gas through a desiccant bed as described above. The desiccant was not completely effective at removing traces of methanol, dimethyl ether and acetone that are adventitiously present in the methyl chloride. The concentration of these components in the methyl chloride was determined by gas chromatography. The determined values for these organic oxygenates were used to calculate the total concentration of these components in the final feed blend. For these examples, the total organic oxygenate concentration is listed in the Table. The methyl chloride used for Run Series 12 to 15 was collected by distillation from liquid methyl chloride treated with triethylaluminum. This procedure removes adventitious methanol, dimethyl ether and acetone. Therefore, the methyl chloride used for these runs does not contain any of these organic oxygenates unless they are purposely added. This aspect also is reflected in the Table. HFC 134a does not contain these organic oxygenates.

A catalyst feed was also prepared for each copolymerization in a separate reservoir. The catalyst feed was prepared by adding a predetermined amount of the stock HCl solution, a hydrocarbon solution of ethylaluminum dichloride (EADC) and optionally an organic oxygenate. The EADC/HCl molar ratio was 3.0. For Run Series 6 to 11, the organic oxygenate used in the run was only added to the catalyst feed. Catalyst feed for Run Series 12, 14 and 15 did not contain organic oxygenates as the oxygenates used in the experiments were added to the monomer feed.

An initial monomer feed was also prepared and charged into the reactor for the purpose of starting the polymerization run. The concentration of monomer in this initial charge was 10 wt % isobutylene. Isoprene was also charged to this initial monomer feed at 2.8 mol % relative to isobutylene. All feeds were chilled to the same temperature as the reactor using the chilled hydrocarbon bath of the glove box. Polymerizations in methyl chloride were conducted at a reactor temperature of −95° C.±3° C. Polymerizations in 134a or the blend were conducted at a reactor temperature of −75° C.±3° C. Near the beginning of the polymerization, the temperature of the bath was lowered a few degrees to provide an initial difference in temperature between the bath and the reactor contents. The copolymerizations were begun by introducing the catalyst. The catalyst flow rate was controlled to provide for a constant differential temperature between the reactor and the bath and achieve the target polymerization temperature for the run. Optionally, the temperature of the bath was lowered to achieve the polymerization temperature target. Addition of monomer feed from the reservoir was introduced into the reactor approximately 10 minutes after the reaction commenced evidenced by the formation of precipitated polymer particles (slurry particles). The run was continued until the monomer feed in the reservoir was exhausted or until the desired amount of monomer feed was consumed. Generally, the average monomer conversion in these runs was better than 75% and at times as high as 95%.

A sample of the polymer was collected from the reactor shortly before the end of the run for molecular weight determination. This sample represents the product produced under a set of conditions at steady-state. This polymer sample was analyzed by Size Exclusion Chromatography to determine the number-average and weight-average molecular weights as well as the MWD of the sample. The MWD reported in the examples is calculated by dividing the weight-average molecular weight by the number-average molecular weight.

Polymer molecular weights were determined by SEC (Size Exclusion Chromatography). The system used was assembled from an Agilent 1100 autosampler, a Waters 515 HPLC pump, a Waters column oven and a Waters 2414 differential refractometer detector. Tetrahydrofuran was used as eluent (1 ml/min., 35° C.) with three PLgel Mixed-B LS 10 μm columns connected in series. A calibration based on narrow molecular weight polyisobutylene standards (American Polymer Standards) was used to calculate molecular weights and distributions.

Polymer molecular weights can be determined on other SEC instruments using different calibration and run protocols. The methodology of SEC (also know as GPC or gel permeation chromatography) to characterize polymer molecular weights has been reviewed in many publications. One such source is the review provided by L. H. Tung in *Polymer Yearbook*, H.-G. Elias and R. A. Pethrick, Eds., Harwood Academic Publishers, New York, 1984, pgs. 93-100, herein incorporated by reference.

The data for each example in the Table represent the average of at least 3 polymerizations conducted at the conditions listed in the Table, namely diluent and organic oxygenate concentrations. The data for average monomer feed rate and average MWD was calculated as a simple average for the total number of runs conducted at that condition. Run Series 1, 2, 4 and 13 do not contain added organic oxygenates and are comparative examples. The remaining examples demonstrate that the addition of organic oxygenates to the feeds results in the broadening of the MWD. See FIG. 2. Furthermore, the data show that increasing the concentration of the oxygenate at the oxygenate levels investigated increases the breadth of the MWD.

TABLE

| Run Series | Diluent | Monomer Rate (ml/min) | MeOH (wppm) | DME (wppm) | Acetone (wppm) | Et$_2$O (wppm) | DIPE (wppm) | MEK (wppm) | Ave. M$_w$/M$_n$ |
|---|---|---|---|---|---|---|---|---|---|
| 1 | 134a | 11.3 | 0 | 0 | 0 | 0 | 0 | 0 | 2.6 |
| 2 | 134a | 18.9 | 0 | 0 | 0 | 0 | 0 | 0 | 2.4 |
| 3 | 134a | 11.6 | 5.0 | 0 | 0 | 0 | 0 | 0 | 3.1 |
| 4 | Blend | 11.4 | 0.2 | 1.2 | 0.2 | 0 | 0 | 0 | 3.0 |
| 5 | Blend | 11.9 | 5.7 | 1.2 | 0.2 | 0 | 0 | 0 | 3.3 |
| 6 | Blend | 10.3 | 5.7 | 1.2 | 0.2 | 3.1 | 0 | 0 | 3.7 |
| 7 | Blend | 9.9 | 5.7 | 1.2 | 0.2 | 8.1 | 0 | 0 | 3.7 |
| 8 | Blend | 10.3 | 5.7 | 1.2 | 3.2 | 0 | 0 | 0 | 4.1 |
| 9 | Blend | 9.2 | 5.7 | 1.2 | 7.0 | 0 | 0 | 0 | 4.9 |
| 10 | Blend | 10.3 | 5.7 | 1.2 | 0.2 | 0 | 10.3 | 0 | 4.6 |
| 11 | Blend | 9.7 | 5.7 | 1.2 | 0.2 | 0 | 0 | 9.8 | 4.6 |
| 12 | Blend | 19.1 | 5.0 | 6.0 | 1.0 | 0 | 0 | 0 | 3.4 |
| 13 | MeCl | 15.0 | 0 | 0 | 0 | 0 | 0 | 0 | 2.5 |
| 14 | MeCl | 16.1 | 5.0 | 0 | 0 | 0 | 0 | 0 | 2.6 |
| 15 | MeCl | 16.8 | 5.0 | 6.0 | 1.0 | 0 | 0 | 0 | 3.4 |

All patents and patent applications, test procedures (such as ASTM methods), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A method to polymerize one or more monomer(s) to form isoolefin polymers and copolymers, comprising:

polymerizing the one or more monomer(s) in a polymerization medium comprising the one or more monomer(s), a diluent and a catalyst system; wherein the diluent comprises one or more halogenated hydrocarbon(s); wherein the catalyst system comprises one or more Lewis acid(s) and a plurality of modifiers comprising one or more initiator(s) and one or more polymorphogenate(s) comprising molecular oxygen or an organic oxygenate(s); and adjusting the concentration of said one or more polymorphogenate(s) in said polymerization medium so that said isoolefin polymers and copolymers have a controlled MWD greater than 2.0.

2. The method of claim 1, further comprising:

supplying the polymerization medium in one or more feed stream(s) to a reactor for the polymerization;

recovering a mixture of polymer and diluent from the reactor;

separating diluent from the mixture to recover the polymer;

recycling the separated diluent to the one or more reactor feed stream(s); and adding at least one of the one or more polymorphogenate(s) to at least one of the one or more feed stream(s).

3. The method of claim 2 wherein the diluent separation comprises removal of polymorphogenate.

4. The method of claim 2 wherein the polymorphogenate addition comprises determining polymorphogenate level in at least one of the one or more feed stream(s) and controlling a rate of the polymorphogenate addition to obtain a polymorphogenate desired level.

5. The method of claim 2 further comprising determining MWD of the recovered polymer and adjusting a rate of the polymorphogenate addition to control the MWD.

6. The method of claim 4 further comprising determining MWD of the recovered polymer and adjusting the polymorphogenate desired level.

7. The method of claim 2 wherein the at least one of the one or more polymorphogenate(s) is added to a monomer feed stream comprising diluent.

8. The method of claim 2 wherein the at least one of the one or more polymorphogenate(s) is added to a catalyst feed stream comprising the one or more Lewis acid(s).

9. The method of claim 2 wherein the one or more feed stream(s) comprises a monomer feed stream, a catalyst feed stream, and a separate feed stream comprising the at least one of the one or more polymorphogenate(s).

10. The method of claim 1 wherein the polymer has MWD less than 6.

11. The method of claim 1, wherein the one or more polymorphogenate(s) further includes at least one corresponding thio compound.

12. The method of claim 1, wherein the one or more polymorphogenate(s) is selected from the group consisting of alcohols, ethers, ketones, aldehydes, esters and carboxylic acids having from 1 to 12 carbon atoms.

13. The method of claim 12 wherein the one or more polymorphogenate(s) further comprise an alcohol.

14. The method of claim 12 wherein the one or more polymorphogenate(s) comprises at least one of ether, ketone or alcohol.

15. The method of claim 1, wherein the one or more polymorphogenate(s) is present in an amount to provide a molar ratio of polymorphogenate to Lewis acid less than 1.

16. The method of claim 1, wherein the one or more polymorphogenate(s) is present in an amount from 5 to 25 wppm by total weight of the polymerization medium.

17. The method of claim 1, wherein the one or more initiator(s) comprises at least one non-chalcogenate.

18. The method of claim 1, wherein the one or more initiator(s) is independently selected from the group consisting of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, and arylalkylacid halide.

19. The method of claim 1, wherein the catalyst system modifiers further comprise a weakly-coordinating anion.

20. The method of claim 1, wherein the diluent has a dielectric constant greater than 6 at 20° C.

21. The method of claim 1, wherein the diluent is selected from the group consisting of ethyl chloride, methyl chloride, methylene chloride, $CHCl_3$, $CCl_4$, n-butyl chloride, chlorobenzene, and mixtures thereof.

22. The method of claim 1, wherein the diluent further comprises a hydrocarbon or a non-reactive olefin and/or an inert gas.

23. The method of claim 1, wherein the diluent comprises one or more hydrofluorocarbon(s) (HFC's).

24. The method of claim 23, wherein the diluent comprises from 15 to 100 volume % HFC based upon the total volume of the diluent.

25. The method of claim 1, wherein the one or more Lewis acid(s) is independently selected from the group consisting of ethylaluminum dichloride, ethylaluminum sesquichloride, diethylaluminum chloride, methyl aluminum dichloride, methylaluminum sesquichloride, dimethylaluminum chloride, and titanium tetrachloride.

26. The method of claim 1, wherein the one or more monomer(s) is independently selected from the group consisting of olefins, alpha-olefins, disubstituted olefins, isoolefins, conjugated dienes, non-conjugated dienes, styrenics, substituted styrenics, and vinyl ethers.

* * * * *